(12) United States Patent
Hedevang

(10) Patent No.: US 11,491,865 B2
(45) Date of Patent: Nov. 8, 2022

(54) METHOD FOR CONTROLLING THE INTERNAL PRESSURE OF A SERVICE FLUID CONTAINER, AND SERVICE FLUID CONTAINER SYSTEM WITH AN INTERNAL PRESSURE CONTROLLER

(71) Applicant: KAUTEX TEXTRON GmbH & CO. KG, Bonn (DE)

(72) Inventor: Poul Hedevang, Bonn (DE)

(73) Assignee: Kautex Textron GmbH & Co., KG, Bonn (DE)

( * ) Notice: Subject to any disclaimer, the term of this patent is extended or adjusted under 35 U.S.C. 154(b) by 334 days.

(21) Appl. No.: 16/330,763

(22) PCT Filed: Sep. 5, 2017

(86) PCT No.: PCT/EP2017/072260
§ 371 (c)(1),
(2) Date: Mar. 5, 2019

(87) PCT Pub. No.: WO2018/046502
PCT Pub. Date: Mar. 15, 2018

(65) Prior Publication Data
US 2019/0184817 A1 Jun. 20, 2019

(30) Foreign Application Priority Data
Sep. 6, 2016 (DE) .......................... 102016216860.6

(51) Int. Cl.
B60K 15/035 (2006.01)
(52) U.S. Cl.
CPC ...... B60K 15/03519 (2013.01); *B60K 2015/0358* (2013.01); *B60K 2015/03514* (2013.01);
(Continued)

(58) Field of Classification Search
CPC .......... F02M 25/0836; F02M 25/0872; F02M 25/089; B60K 15/03519;
(Continued)

(56) References Cited

U.S. PATENT DOCUMENTS

| H928 H | 6/1991 | Gallegos |
|---|---|---|
| 5,572,981 A | 11/1996 | Pfleger et al. |

(Continued)

FOREIGN PATENT DOCUMENTS

| CN | 101039814 A | 9/2007 |
|---|---|---|
| CN | 104487275 A | 4/2015 |

(Continued)

OTHER PUBLICATIONS

"International Preliminary Report on Patentability received for PCT Patent Application No. PCT/EP2017/072260, dated Mar. 21, 2019", 9 pages.

(Continued)

*Primary Examiner* — Logan M Kraft
*Assistant Examiner* — Anthony L Bacon
(74) *Attorney, Agent, or Firm* — Wiley Rein LLP

(57) ABSTRACT

The present invention discloses a method and operating liquid container system for controlling the internal pressure of an operating liquid container of a motor vehicle, wherein the method includes determining an internal pressure of the operating liquid container by means of a pressure sensor arranged in an operating liquid container interior; comparing the determined internal pressure with a predetermined maximum internal pressure by means of an electronic control device; outputting an opening signal from the control device to a vent valve that is arranged in a vent line or between the operating liquid container interior and the vent line, wherein the vent line fluidically connects the operating liquid container interior to the atmosphere when the determined inter- (Continued)

nal pressure is equal to the maximum internal pressure or above the maximum internal pressure; and transferring the vent valve into an open position.

8 Claims, 4 Drawing Sheets

(52) U.S. Cl.
CPC .............. *B60K 2015/03571* (2013.01); *B60K 2015/03585* (2013.01)

(58) Field of Classification Search
CPC ........... B60K 2015/03514; B60K 2015/03571; B60K 2015/0358; B60K 2015/03585
See application file for complete search history.

(56) References Cited

U.S. PATENT DOCUMENTS

| | | | |
|---|---|---|---|
| 5,730,107 | A | 3/1998 | Blumenstock |
| 5,850,819 | A | 12/1998 | Kunimitsu et al. |
| 10,858,118 | B2 * | 12/2020 | Behbahani-Pour .... B64D 37/32 |
| 2005/0279406 | A1 | 12/2005 | Atwood et al. |
| 2010/0101541 | A1 | 4/2010 | Grunwald et al. |
| 2011/0079201 | A1 * | 4/2011 | Peters ................ F02M 25/0818 123/520 |
| 2011/0253110 | A1 | 10/2011 | Fukui |
| 2012/0097269 | A1 | 4/2012 | Horiba et al. |
| 2012/0111307 | A1 | 5/2012 | Hagen |
| 2013/0221000 | A1 | 8/2013 | Iwaya et al. |
| 2014/0060661 | A1 | 3/2014 | Miura et al. |
| 2014/0197188 | A1 * | 7/2014 | Criel ................ B60K 15/03504 220/746 |
| 2015/0096633 | A1 * | 4/2015 | Pifer ................... F16K 31/0624 137/599.11 |
| 2015/0114362 | A1 | 4/2015 | Costa-patry et al. |
| 2015/0285394 | A1 | 10/2015 | Akimoto et al. |
| 2015/0337777 | A1 | 11/2015 | Hagen |
| 2016/0177884 | A1 * | 6/2016 | Shimokawa ....... F02M 25/0854 123/519 |
| 2016/0186699 | A1 * | 6/2016 | Fukui .................. B60K 15/035 123/520 |
| 2016/0298778 | A1 * | 10/2016 | Young ................ F02M 25/0836 |
| 2017/0145963 | A1 * | 5/2017 | Dudar ................ F02M 25/0872 |
| 2017/0282706 | A1 * | 10/2017 | Miyabe ................ F02D 41/004 |
| 2017/0284317 | A1 * | 10/2017 | Kimoto ................ F02D 41/004 |
| 2018/0087475 | A1 * | 3/2018 | Mills ................ B60K 15/03519 |
| 2018/0105034 | A1 * | 4/2018 | Ambrose ......... B60K 15/03519 |
| 2018/0370351 | A1 * | 12/2018 | Vulkan .................... B60Q 9/00 |
| 2019/0145326 | A1 * | 5/2019 | Nahar .................. F02D 41/003 123/519 |
| 2019/0353121 | A1 * | 11/2019 | Mills ................ B60K 15/03519 |

FOREIGN PATENT DOCUMENTS

| | | |
|---|---|---|
| CN | 105089883 A | 11/2015 |
| CN | 105539126 A | 5/2016 |
| CN | 105612076 A | 5/2016 |
| CN | 105644349 A | 6/2016 |
| CN | 105736200 A | 7/2016 |
| DE | 4040895 A1 | 6/1992 |
| DE | 19523936 A1 | 1/1997 |
| DE | 19930926 A1 | 5/2000 |
| DE | 10247935 A1 | 4/2004 |
| DE | 102009036262 A1 | 2/2011 |
| DE | 102010019831 A1 | 11/2011 |
| DE | 102011075975 A1 | 12/2011 |
| DE | 102010054960 A1 | 6/2012 |
| DE | 102011084732 A1 | 4/2013 |
| DE | 102012221871 A1 | 6/2014 |
| DE | 102015012656 A1 | 4/2016 |
| GB | 2286695 A | 8/1995 |
| GB | 9516061 | 10/1995 |
| JP | H07-217504 A | 8/1995 |
| JP | H07-317611 A | 12/1995 |
| JP | H09-119351 A | 5/1997 |
| JP | H10-505398 A | 5/1998 |
| JP | 2011-226308 A | 11/2011 |
| JP | 2012-092685 A | 5/2012 |
| JP | 2013-154693 A | 8/2013 |
| JP | 2014-051909 A | 3/2014 |
| JP | 2015-045264 A | 3/2015 |
| KR | 10-2014-0075735 A | 6/2014 |
| WO | 2016-035654 A1 | 3/2016 |
| WO | 2018/046502 A1 | 3/2018 |

OTHER PUBLICATIONS

"Office Action received for Korean Patent Application No. 10-2019-7009200, dated Mar. 31, 2020", 11 pages.
International Search Report dated Jan. 18, 2018, issued in International Application No. PCT/EP2017/072260 filed Sep. 5, 2017.
Written Opinion, in International Application No. EP/2017/072260, filed Sep. 5, 2017.
"Decision of Rejection received for Japanese Patent Application No. 2019-533686, dated Oct. 12, 2020", 3 pages (English Translation only).
Office Action received for European Patent Application No. 17768042.8, dated Feb. 4, 2021, 5 pages (Official copy only).
Notification to Grant received for Chinese Patent Application Serial No. 201780054558.X dated May 12, 2022, 5 pages (1 page of English Translation and 4 page of Official Copy).

* cited by examiner

METHOD FOR CONTROLLING THE INTERNAL PRESSURE OF A SERVICE FLUID CONTAINER, AND SERVICE FLUID CONTAINER SYSTEM WITH AN INTERNAL PRESSURE CONTROLLER

RELATED APPLICATIONS

This Application is a § 371 National Stage Application of PCT/EP2017/072260, filed Sep. 5, 2017, which claims priority benefit of German Patent Application No. 102016216860.6, filed Sep. 6, 2016, which applications are incorporated entirely by reference herein for all purposes.

FIELD

The present invention relates to a method for controlling the internal pressure of an operating liquid container of a motor vehicle. The present invention also relates to an operating liquid container system.

In the following text, reference is made to operating liquid containers in the form of fuel containers or as fuel tanks and to operating liquid container systems in the form of fuel container systems. Operating liquid containers within the meaning of the invention are in particular but not exclusively fuel containers (for gasoline or diesel fuel) for motor vehicles, urea containers, windshield wiper water containers, oil containers, auxiliary liquid containers or additive containers for motor vehicles. Containers of the type mentioned at the beginning are frequently produced by extrusion blow molding, wherein in particular HDPE (High Density Polyethylene) is suitable for producing extrusion blow molded containers. It is also possible to produce corresponding operating liquid containers by means of an injection molding method. Furthermore, operating liquid containers made of metal can also be used.

BACKGROUND ART

In motor vehicles having an internal combustion engine, when a fuel container is subjected to heat, the fuel is likewise heated, and so the vapor pressure of the fuel rises and the fuel container is subjected to a corresponding internal pressure. The pressure rise within the fuel container would last until the internal pressure of the fuel container corresponds to the partial pressure of the fuel and a pressure equilibrium is established. Here, at high ambient temperatures, the partial pressure and the thus established internal pressure of the fuel container are greater than at low ambient temperatures. As a result of being subjected to internal pressure in this way, the fuel container undergoes deformation.

In order to vent a fuel container, the latter has at least one vent valve, which is fluidically connected in turn to a vent line for dissipating the overpressure to the atmosphere. In particular in the case of a fuel container designed for gasoline, the vent line thereof is fluidically connected to an activated carbon filter for passing through and filtering out fuel vapors. The gases filtered by the activated carbon filter are emitted to the atmosphere after passing through the activated carbon filter. During operation of the internal combustion engine, the activated carbon filter is flushed with intake air, such that fuel vapors bound in the activated carbon can be fed to the internal combustion engine. On account of the flushing process with intake air, the absorption capacity of the activated carbon filter can be limited.

Motor vehicles which have a hybrid drive, i.e. which have both an internal combustion engine and an electric motor for driving the motor vehicle, require a fuel container which can withstand increased internal pressures. In such hybrid motor vehicles, on account of the shorter operating time of the internal combustion engine, an activated carbon filter fluidically connected to the fuel container is accordingly flushed less, and so less fuel vapor bound in the activated carbon can be flushed out. Furthermore, by venting the fuel container via the activated carbon filter, further fuel is converted into the vapor phase, and so it would be advantageous to embody the fuel container in a more rigid and/or pressure-resistant manner.

Consequently, for fuel containers which are designed for hybrid motor vehicles, other vent valves are necessary than for fuel containers that are designed for conventional motor vehicles, i.e. those having only an internal combustion engine. This is because a maximum internal pressure for a fuel container for a hybrid motor vehicle is greater than a maximum internal pressure of a fuel container for a conventional motor vehicle, and so different vent valves have to be installed. Therefore, for a producer of fuel containers and generally of operating liquid containers, it is necessary to design and store a large number of differently configured vent valves, this resulting in increased production complexity and higher production costs.

SUMMARY OF THE INVENTION

The present invention is based on the object of providing a method for controlling an internal pressure of an operating liquid container, by which the complexity and the production costs of an operating liquid container are reduced. The present invention is also based on the object of providing an operating liquid container system that has reduced production complexity and lower production costs.

The object underlying the present invention is achieved by a method for controlling the internal pressure of an operating liquid container having the features of claim 1. Advantageous refinements of the method according to the invention are disclosed in the claims dependent on claim 1.

The object underlying the present invention is also achieved by a method for controlling the internal pressure of an operating liquid container having the features of claim 3. Advantageous refinements of the method according to the invention are disclosed in the claims dependent on claim 3.

The object underlying the present invention is also achieved by an operating liquid container system having the features of claim 7. Advantageous refinements of the operating liquid container system according to the invention are disclosed in the claims dependent on claim 7.

More specifically, the object underlying the present invention is achieved by a method for controlling the internal pressure of an operating liquid container of a motor vehicle, wherein the method according to the invention has the following method steps of:

determining an internal pressure of the operating liquid container by means of a pressure sensor arranged in an operating liquid container interior;

comparing the determined internal pressure with a predetermined maximum internal pressure by means of an electronic control device;

outputting an opening signal from the control device to a vent valve that is arranged in a vent line or between the operating liquid container interior and the vent line, wherein the vent line fluidically connects the operating liquid container interior to the atmosphere when the determined internal pressure is equal to the maximum internal pressure or above the maximum internal pressure; and transferring the vent valve into an open position, in which the operating liquid container interior is fluidically connected to the atmosphere by means of the vent valve, when the opening signal is received.

As a result of the method according to the invention, a vent valve of one design can be used for different operating liquid containers that are each configured for different maximum internal pressures, which can also be referred to as limit pressures. The same goes for the electronic control device, which is connected to the vent valve and the pressure sensor via a data line for exchanging data. The electronic control device can also be used for different operating liquid containers, wherein, for different operating liquid containers with different maximum internal pressures, only the maximum internal pressure accordingly has to be stored in the electronic control device or in a storage device to which the electronic control device has access.

The method for controlling the internal pressure can also be referred to as a method for controlling the venting of an operating liquid container.

The operating liquid container is preferably a fuel container, which can also be referred to as a fuel tank. The fuel container is designed preferably to hold gasoline. As a further preference, the fuel container is designed to hold diesel fuel.

The internal pressure of the operating liquid container is the pressure within the operating liquid container, i.e. the pressure in the operating liquid container interior.

The pressure sensor can also be referred to as an internal pressure sensor.

The predetermined maximum internal pressure, which can also be referred to as limit internal pressure, is stored preferably in the electronic control device, more specifically in a storage device that is integrated in the electronic control device or to which the electronic control device has access.

The electronic control device is preferably a data processing control device. The control device can be a separate control device of the operating liquid container or of an operating liquid container system and/or a control device of the motor vehicle in which the operating liquid container is installed.

The vent valve is a vent valve of the operating liquid container. The vent valve can be in an open position and in a closed position. In the open position, the operating liquid container interior is fluidically connected to the atmosphere by means of the vent line and the vent valve. Preferably, an adsorption filter for adsorbing hydrocarbons is additionally arranged in the venting path formed by the vent line and the vent valve, i.e. the operating liquid container interior is fluidically connected to the adsorption filter and the latter is fluidically connected to the atmosphere. Therefore, the operating liquid container interior is vented via the adsorption filter. In the closed position of the vent valve, the operating liquid container interior is fluidically separated from the atmosphere. If an adsorption filter is arranged in the venting path, the operating liquid container interior is fluidically separated from the adsorption filter in the closed position of the vent valve.

Preferably, the method has the following method steps of:
comparing the determined internal pressure with a predetermined minimum internal pressure by means of the electronic control device;
outputting an opening signal from the control device to the vent valve when the determined internal pressure is equal to the minimum internal pressure or below the minimum internal pressure; and
transferring the vent valve into the open position, in which the operating liquid container interior is fluidically separated from the atmosphere by means of the vent valve, when the opening signal is received.

An operating liquid container is subjected to a negative pressure when operating liquid is conveyed out of the container and/or when operating liquid, for example fuel condenses. The accordingly designed method affords the advantage that the operating liquid container is protected from an excessive negative pressure. Furthermore, as a result of the accordingly designed method, a vent valve of one design can be used for different operating liquid containers that are each configured for different minimum internal pressures. The same goes for the electronic control device, which is connected to the vent valve and the pressure sensor via a data line for exchanging data. The electronic control device can also be used for different operating liquid containers, wherein, for different operating liquid containers with different minimum internal pressures, only the minimum internal pressure accordingly has to be stored in the electronic control device or in a storage device to which the electronic control device has access.

The object underlying the present invention is also achieved by a method for controlling the internal pressure of an operating liquid container of a motor vehicle, wherein the method according to the invention has the following method steps of:
determining an internal pressure of the operating liquid container by means of a pressure sensor arranged in an operating liquid container interior;
determining an ambient pressure of the operating liquid container by means of an ambient pressure sensor;
determining a differential pressure between the internal pressure and the ambient pressure by means of an electronic control device;
comparing the differential pressure with a predetermined maximum differential pressure by means of the control device;
outputting an opening signal from the control device to a vent valve that is arranged in a vent line or between the operating liquid container interior and the vent line, wherein the vent line fluidically connects the operating liquid container interior to the atmosphere when the determined differential pressure is equal to the maximum differential pressure or above the maximum differential pressure; and
transferring the vent valve into an open position, in which the operating liquid container interior is fluidically connected to the atmosphere by means of the vent valve, when the opening signal is received.

As a result of the accordingly designed method according to the invention, any exceeding of an overpressure that is harmful for the operating liquid container can be prevented with even greater accuracy and reliability. This is because the ambient pressure of the operating liquid container, which counteracts the internal pressure of the operating liquid container, is also taken into consideration for controlling the vent valve. Thus, the vent valve is transferred into its open position depending on the ambient pressure.

Also as a result of the accordingly designed method, a vent valve of one design can be used for different operating liquid containers that are each configured for different maximum internal pressures. The same goes for the electronic control device, which is connected to the vent valve, the pressure sensor and the ambient pressure sensor via a data line for exchanging data. The electronic control device can also be used for different operating liquid containers, wherein, for different operating liquid containers with different maximum differential pressures, only the maximum differential pressure accordingly has to be stored in the electronic control device or in a storage device to which the electronic control device has access.

The method for controlling the internal pressure can also be referred to as a method for controlling the venting of an operating liquid container.

The operating liquid container is preferably a fuel container, which can also be referred to as a fuel tank. The fuel container is designed preferably to hold gasoline. As a further preference, the fuel container is designed to hold diesel fuel.

The internal pressure of the operating liquid container is the pressure within the operating liquid container, i.e. the pressure in the operating liquid container interior. The pressure sensor can also be referred to as an internal pressure sensor.

The ambient pressure of the operating liquid container is the external pressure or atmospheric pressure. The differential pressure consequently results from the subtraction of the ambient pressure from the internal pressure. The ambient pressure sensor can also be referred to as an external pressure sensor. The ambient pressure sensor is arranged outside the operating liquid container interior.

The predetermined maximum differential pressure, which can also be referred to as limit differential pressure, is stored preferably in the electronic control device, more specifically in a storage device that is integrated in the electronic control device or to which the electronic control device has access.

The electronic control device is preferably a data processing control device. The control device can be a separate control device of the operating liquid container or of an operating liquid container system and/or a control device of the motor vehicle in which the operating liquid container is installed.

The vent valve is a vent valve of the operating liquid container. The vent valve can be in an open position and in a closed position. In the open position, the operating liquid container interior is fluidically connected to the atmosphere by means of the vent line and the vent valve. Preferably, an adsorption filter for adsorbing hydrocarbons is additionally arranged in the venting path formed by the vent line and the vent valve, i.e. the operating liquid container interior is fluidically connected to the adsorption filter and the latter is fluidically connected to the atmosphere. Therefore, the operating liquid container interior is vented via the adsorption filter. In the closed position of the vent valve, the operating liquid container interior is fluidically separated from the atmosphere. If an adsorption filter is arranged in the venting path, the operating liquid container interior is fluidically separated from the adsorption filter in the closed position of the vent valve.

Preferably, the method has the following method steps of:

comparing the differential pressure with a predetermined minimum differential pressure by means of the control device;

outputting an opening signal from the control device to the vent valve when the determined differential pressure is equal to the minimum differential pressure or below the minimum differential pressure; and transferring the vent valve into the open position, in which the operating liquid container interior is fluidically connected to the atmosphere by means of the vent valve, when the opening signal is received.

As a result of the accordingly designed method according to the invention, any dropping below of a negative pressure that is harmful for the operating liquid container can be prevented with even greater accuracy and reliability. This is because the ambient pressure of the operating liquid container, which counteracts the internal pressure of the operating liquid container, is also taken into consideration for controlling the vent valve. Thus, the vent valve is transferred into its open position depending on the ambient pressure.

An operating liquid container is subjected to a negative pressure when operating liquid is conveyed out of the container and/or when operating liquid vapor, for example fuel vapor condenses. The accordingly designed method affords the advantage that the operating liquid container is protected from an excessive negative pressure. Furthermore, as a result of the accordingly designed method, a vent valve of one design can be used for different operating liquid containers that are each configured for different minimum differential pressures. The same goes for the electronic control device, which is connected to the vent valve, the pressure sensor and the ambient pressure sensor via a data line for exchanging data. The electronic control device can also be used for different operating liquid containers, wherein, for different operating liquid containers with different minimum differential pressures, only the minimum differential pressure accordingly has to be stored in the electronic control device or in a storage device to which the electronic control device has access.

Preferably, the method is designed such that, in the method step of transferring the vent valve into its open position, the vent valve is transferred gradually into its open position.

Gradually transferring the vent valve into its open position is understood as meaning that the vent valve is transferred progressively into its open position, wherein a venting cross section of the vent valve is increased continuously for a predetermined time as far as a maximally achievable venting cross section.

For example, when the opening signal is received, the venting cross section of the vent valve can be set to for example 10% (more or less is also possible) of the maximally achievable venting cross section for a predetermined time, before the vent valve is transferred completely into its open position.

In a corresponding design of the method, pressure peaks are avoided during venting and/or aerating of the operating liquid container, this being advantageous in particular in the case of fuel containers configured for hybrid motor vehicles, since a very high overpressure or negative pressure can build up in these containers.

Preferably, the method is designed such that it has the following method steps of:

determining whether a regenerating valve arranged in a flushing line or between a flushing connection of an adsorption filter and the flushing line is in an open position, wherein the flushing line fluidically connects an adsorption filter interior to an intake tract of an internal combustion engine of the motor vehicle;

outputting a closing signal from the control device to the vent valve when the regenerating valve is in the open position; and transferring the vent valve into a closed position, in which the operating liquid container interior is fluidically separated from the atmosphere by means of the vent valve, when the closing signal is received.

The accordingly designed method affords the advantage that an unnecessary negative pressure is not generated in the operating liquid container. Furthermore, the accordingly designed method affords the advantage that the composition of the fuel mixture that is drawn in by the internal combustion engine via the intake tract thereof does not suddenly change, and so a more uniform exhaust gas quality is achieved.

When the regenerating valve is in its open position, with the internal combustion engine in operation, the adsorption filter is flushed by means of intake air of the internal combustion engine. Consequently, a flushing process for releasing hydrocarbons from adsorption material located in the adsorption filter is then carried out at the adsorption filter.

In general, the first feature can also be formulated as follows: determining whether a fluidic connection between a flushing connection of the adsorption filter and an intake tract of the internal combustion engine exists/has been established.

The first feature can also be formulated in another way as follows: determining whether a regenerating valve arranged in a flushing path between an adsorption filter and an intake tract of the internal combustion engine is in an open position.

Alternatively, the first feature can also be formulated as follows: determining whether a flushing process of the adsorption filter is being carried out.

The object underlying the present invention is also achieved by an operating liquid container system that has the following:
- at least one operating liquid container;
- at least one pressure sensor, arranged in an operating liquid container interior, for determining an internal pressure of the operating liquid container interior;
- a vent line that fluidically connects the operating liquid container interior to the atmosphere;
- an electrically actuable vent valve that is arranged in the vent line or between the operating liquid container interior and the vent line and is actuable between an open position, in which the operating liquid container interior is fluidically connected to the atmosphere, and a closed position, in which the operating liquid container interior is fluidically separated from the atmosphere by means of the vent valve; and
- an electronic control device that is connected to the pressure sensor and the vent valve via a data line and is configured to carry out a method as claimed in either of claims 1 and/or 2.

The operating liquid container system according to the invention affords the advantage that a vent valve of one design can be used for different operating liquid containers that are each configured for different maximum internal pressures. The same goes for the electronic control device, which is connected to the vent valve and the pressure sensor via a data line for exchanging data. The electronic control device can also be used for different operating liquid containers, wherein, for different operating liquid containers with different maximum internal pressures, only the maximum internal pressure accordingly has to be stored in the electronic control device or in a storage device to which the electronic control device has access.

The operating liquid container is preferably a fuel container, which can also be referred to as a fuel tank. The fuel container is designed preferably to hold gasoline. As a further preference, the fuel container is designed to hold diesel fuel.

The predetermined maximum internal pressure, which can also be referred to as limit internal pressure, is stored preferably in the electronic control device, more specifically in a storage device that is integrated in the electronic control device or to which the electronic control device has access.

The electronic control device is preferably a data processing control device. The control device can be a separate control device of the operating liquid container or of an operating liquid container system and/or a control device of the motor vehicle in which the operating liquid container is installed.

The vent valve is a vent valve of the operating liquid container. The vent valve can be in an open position and in a closed position. In the open position, the operating liquid container interior is fluidically connected to the atmosphere by means of the vent line and the vent valve. Preferably, an adsorption filter for adsorbing hydrocarbons is additionally arranged in the venting path formed by the vent line and the vent valve, i.e. the operating liquid container interior is fluidically connected to the adsorption filter and the latter is fluidically connected to the atmosphere. Therefore, the operating liquid container interior is vented via the adsorption filter. In the closed position of the vent valve, the operating liquid container interior is fluidically separated from the atmosphere. If an adsorption filter is arranged in the venting path, the operating liquid container interior is fluidically separated from the adsorption filter in the closed position of the vent valve.

Preferably, the operating liquid container system has an ambient pressure sensor for determining an ambient pressure of the operating liquid container, and the electronic control device is configured to carry out a method as claimed in either of claims 3 and/or 4.

The accordingly designed operating liquid container system affords the advantage that the operating liquid container is protected from an excessive negative pressure. Furthermore, as a result of the accordingly designed operating liquid container system, a vent valve of one design can be used for different operating liquid containers that are each configured for different minimum internal pressures. The same goes for the electronic control device, which is connected to the vent valve and the pressure sensor via a data line for exchanging data. The electronic control device can also be used for different operating liquid containers, wherein, for different operating liquid containers with different minimum internal pressures, only the minimum internal pressure accordingly has to be stored in the electronic control device or in a storage device to which the electronic control device has access.

The ambient pressure sensor is arranged preferably outside the operating liquid container interior.

As a further preference, the operating liquid container system has an adsorption filter that is fluidically connected to the vent line by means of an inlet connection and to the atmosphere by means of an outlet connection, wherein the electronic control device is configured to carry out the following method steps of:
- determining whether a regenerating valve arranged in a flushing line or between a flushing connection of an adsorption filter and the flushing line is in an open position, wherein the flushing line fluidically connects an adsorption filter interior to an intake tract of an internal combustion engine of the motor vehicle;
- outputting a closing signal from the control device to the vent valve when the regenerating valve is in the open position; and
- transferring the vent valve into a closed position, in which the operating liquid container interior is fluidically separated from the atmosphere by means of the vent valve, when the closing signal is received.

The accordingly designed operating liquid container system affords the advantage that an unnecessary negative pressure does not arise in the operating liquid container. Furthermore, it is also ensured that the composition of the fuel mixture that is drawn in by the internal combustion engine via the intake tract thereof does not suddenly change, and so a more uniform exhaust gas quality is achieved.

When the regenerating valve is in its open position, with the internal combustion engine in operation, the adsorption filter is flushed by means of intake air of the internal combustion engine. Consequently, a flushing process for releasing hydrocarbons from adsorption material located in the adsorption filter is then carried out at the adsorption filter.

The adsorption filter, which is preferably in the form of an activated carbon filter, has an inlet connection for the fluidic connection to the vent line and an outlet connection for the fluidic connection to the atmosphere.

Preferably, a shutoff valve is arranged between the outlet connection of the adsorption filter and the atmosphere, said shutoff valve also being actuable preferably electrically, i.e. electromechanically and/or electromagnetically between an open position and a closed position.

As a further preference, the operating liquid container system has an overpressure protection valve that is arranged in the vent line or between the operating liquid container interior and the vent line, wherein the overpressure protection valve is movable between an open position, in which gas exchange is allowed by the overpressure protection valve, and a closed position, in which gas exchange is prevented by the overpressure protection valve. The overpressure protection valve is in its closed position when the internal pressure in the operating liquid container interior is below the maximum pressure, and the overpressure protection valve is transferred into its open position when the internal pressure in the operating liquid container interior is above the maximum pressure.

The accordingly designed operating liquid container system affords the advantage that, in the event of a power outage, for example when a battery for actuating the vent valve is empty on account of long periods of inactivity of the motor vehicle, an overpressure that exceeds the maximum pressure cannot build up in the operating liquid container. This is advantageous in particular in the case of a vent valve that is in its closed position when in the deenergized state.

Consequently, the overpressure protection valve is connected in parallel with the vent valve.

The overpressure protection valve is a passive overpressure protection valve. In other words, a valve body of the overpressure protection valve is not movable electrically (i.e. neither electromechanically nor electromagnetically) but only as a result of a pressure difference.

In the open position of the overpressure protection valve, a valve body of the overpressure protection valve is spaced apart from a valve seat of the overpressure protection valve. In the closed position of the overpressure protection valve, the valve body of the overpressure protection valve closes the valve seat of the overpressure protection valve.

As a further preference, the operating liquid container system has a negative pressure protection valve that is arranged in the vent line or between the operating liquid container interior and the vent line (70), wherein the negative pressure protection valve is movable between an open position, in which gas exchange is allowed by the negative pressure protection valve, and a closed position, in which gas exchange is prevented by the negative pressure protection valve. The negative pressure protection valve is in its closed position when the internal pressure in the operating liquid container interior is above the minimum pressure, and the negative pressure protection valve is transferred into its open position when the internal pressure in the operating liquid container interior is below the minimum pressure.

The accordingly designed operating liquid container system affords the advantage that, in the event of a power outage, for example when a battery for actuating the vent valve is empty on account of long periods of inactivity of the motor vehicle, a negative pressure that drops below the minimum internal pressure cannot be established in the operating liquid container. This is advantageous in particular in the case of a vent valve that is in its closed position when in the deenergized state.

Consequently, the negative pressure protection valve is connected in parallel with the vent valve.

The negative pressure protection valve is a passive negative pressure protection valve. In other words, a valve body of the negative pressure protection valve is not movable electrically (i.e. neither electromechanically nor electromagnetically) but only as a result of a pressure difference.

In the open position of the negative pressure protection valve, a valve body of the negative pressure protection valve is spaced apart from a valve seat of the negative pressure protection valve. In the closed position of the negative pressure protection valve, the valve body of the negative pressure protection valve closes the valve seat of the negative pressure protection valve.

As a further preference, the operating liquid container system has a filler tube that leads into the operating liquid container interior, and a refueling vent line that is fluidically connected to the operating liquid container interior and the filler tube. The electrically actuable vent valve is configured as a service and/or refueling vent valve with a service venting inlet connection, a service venting outlet connection, a refueling venting inlet connection and a refueling venting outlet connection. The service venting inlet connection and the refueling venting inlet connection are each fluidically connected to the operating liquid container interior, the service venting outlet connection is fluidically connected to the atmosphere, and the refueling venting outlet connection is fluidically connected to the filler tube. The service and/or refueling vent valve is electrically actuable between a venting position, a refueling position and a closed position, wherein, in the venting position, the operating liquid container interior is fluidically connected to the atmosphere and to the filler tube by means of the service and/or refueling vent valve. In the refueling position, the operating liquid container interior is fluidically separated from the atmosphere by means of the service and/or refueling vent valve and fluidically connected to the filler tube by means of the service and/or refueling vent valve, and in the closed position, the operating liquid container interior is fluidically separated from the atmosphere and the filler tube by means of the service and/or refueling vent valve.

Preferably, the service venting outlet connection is fluidically connected to the atmosphere via an adsorption filter. Consequently, during service venting, the gas emerging from the operating liquid container is passed through the adsorption filter.

BRIEF DESCRIPTION OF THE DRAWINGS

Further advantages, details and features of the invention will become apparent in the following text from the explained exemplary embodiments, in which, specifically.

DETAILED DESCRIPTION OF THE EMBODIMENTS

In the following description, identical reference signs denote identical components or identical features, and so a description given for a component with regard to one figure also applies to the other figures, thereby avoiding a repetitive description. Furthermore, individual features that have been described in conjunction with one embodiment are also usable separately in other embodiments.

Figure 1:
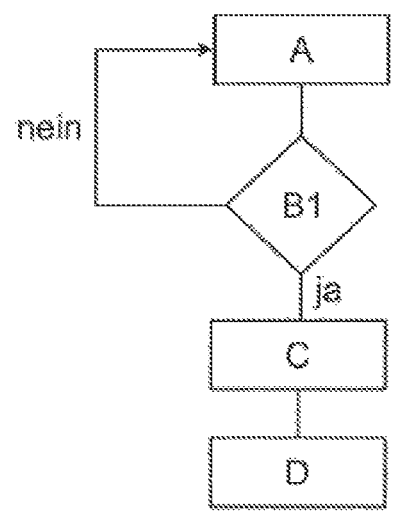
FIG. 1: shows a flowchart of a method according to the invention according to a first embodiment of the present invention.

FIG. 1 shows a flowchart of a method according to the invention according to a first embodiment of the present invention.

In a first method step A, an internal pressure of an operating liquid container 10 (see FIGS. 5 to 8) is determined. The internal pressure can be determined for example by means of a pressure sensor 15 arranged in an operating liquid container interior 11. The pressure sensor 15 can alternatively also be arranged in a filler tube 12.

In a second method step B1, the determined internal pressure is compared with a predetermined maximum internal pressure. This comparison can take place preferably by means of an electronic control device. If the determined internal pressure is lower than the predetermined maximum internal pressure, the method returns to the first method step A.

If, by contrast, the determined internal pressure is equal to the maximum internal pressure or above the maximum internal pressure, an opening signal is output in a third method step C. The opening signal is in this case output preferably by means of the electronic control device to a vent valve 20. As is apparent from FIGS. 6 to 9, the vent valve 20 is arranged in a vent line 70 or between the operating liquid container interior 11 and the vent line 70, wherein the vent line 70 fluidically connects the operating liquid container interior 11 to the atmosphere.

When the opening signal is received, in a fourth method step, the vent valve 20 is transferred into an open position in which the operating liquid container interior 11 is fluidically connected to the atmosphere by means of the vent valve 20.

Figure 2:
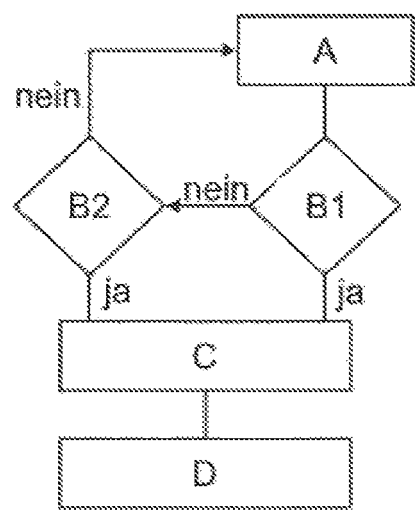
FIG. 2: shows a flowchart of a method according to the invention according to a second embodiment of the present invention.

FIG. 2 shows a flowchart of a method according to the invention according to a second embodiment of the present invention.

The first method step A and the second method step B2 are formed identically to in the method according to the first embodiment of the present invention. If it is determined, in the second method step B1, that the determined internal pressure is below the maximum internal pressure, that is to say when the determined internal pressure is not equal to the maximum pressure and not above the maximum internal pressure, a fifth method step B2 is carried out, in which the determined internal pressure is compared with a predetermined minimum internal pressure. The fifth method step B2 is in this case carried out preferably by means of the electronic control device.

If it is determined, in the fifth method step B2, that the determined internal pressure is not equal to the minimum internal pressure or is above the minimum internal pressure, the method returns to the first method step A. If, by contrast, it is determined in the fifth method step B2 that the determined internal pressure is equal to the minimum internal pressure or below the minimum internal pressure, the third method step C is carried out, i.e. an opening signal is output to the vent valve 20. This method step is carried out preferably by the electronic control device. Subsequently, the fourth method step D is carried out, according to which the vent valve 20 is transferred into the open position when the opening signal is received, wherein, in the open position of the vent valve 20, the operating liquid container interior 11 is fluidically connected to the atmosphere by means of the vent valve 20.

Thus, as a result of the method according to the second embodiment of the present invention, the internal pressure of the operating liquid container 10 is in a predetermined pressure range, wherein the predetermined pressure range is bounded by the minimum internal pressure and by the maximum internal pressure.

Figure 3:
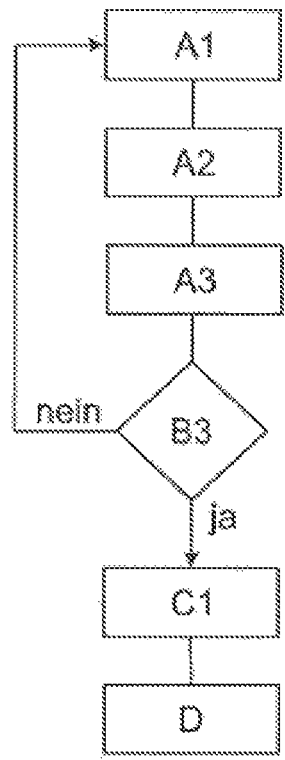
FIG. 3: shows a flowchart of a method according to the invention according to a third embodiment of the present invention.

FIG. 3 shows a flowchart of a method according to the invention according to a third embodiment of the present invention.

In a first method step A1, an internal pressure of the operating liquid container 10 is determined. The internal pressure is in this case determined by means of a pressure sensor 15 arranged in the operating liquid container interior 11.

Subsequently, in a second method step A2, an ambient pressure of the operating liquid container 10 is determined. The ambient pressure is determined by means of an ambient pressure sensor 16 that is arranged outside the operating liquid container interior 11.

In a third method step A3, a differential pressure between the internal pressure and the ambient pressure is determined, wherein the third method step is carried out preferably by means of the electronic control device. The differential pressure consequently results from the subtraction of the determined ambient pressure from the determined internal pressure.

In a fourth method step B3, which is carried out preferably likewise by the electronic control device, the differential pressure is compared with a predetermined maximum differential pressure. If the differential pressure is below the maximum differential pressure, the method returns to the first method step A1.

If, by contrast, it is determined in the fourth method step B3 that the determined differential pressure is equal to the maximum differential pressure or greater than the maximum differential pressure, a fifth method step C1 is carried out, according to which an opening signal is output to the vent valve 20. The opening signal is in this case output from the electronic control device. The vent valve 20 is in this case arranged in the vent line 70 or between the operating liquid container interior 11 and the vent line 70. Consequently, the operating liquid container interior 11 is fluidically connected to the atmosphere by means of the vent line 70.

When the opening signal is received, in a sixth method step, the vent valve 20 is transferred into its open position, in which the operating liquid container interior 11 is fluidically connected to the atmosphere by means of the vent valve 20.

Figure 4:
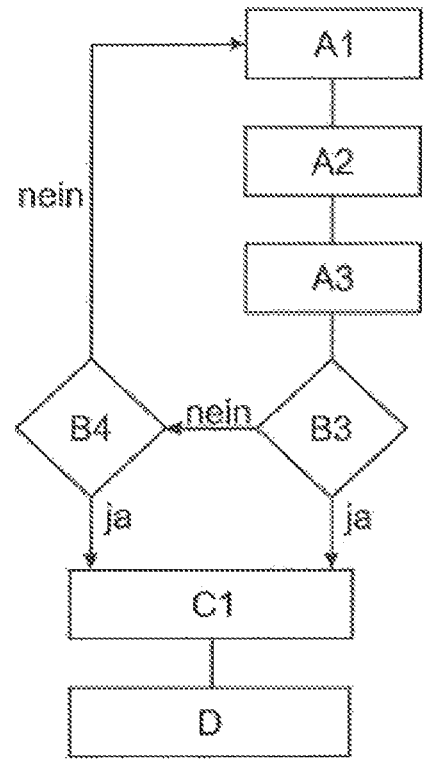
FIG. 4: shows a flowchart of a method according to the invention according to a fourth embodiment of the present invention.

FIG. 4 shows a flowchart of a method according to the invention according to a fourth embodiment of the present invention.

In this case, the first four method steps, i.e. the first method step A1, the second method step A2, the third method step A3 and the fourth method step B3 of the method according to the fourth embodiment are configured identically to the first four method steps of the third embodiment.

If it is determined, in the fourth method step B3, that the determined differential pressure is below the maximum differential pressure, a method step B4 is carried out, according to which the differential pressure is compared with a predetermined minimum differential pressure. If the minimum differential pressure is above the minimum differential pressure, the method returns to the first method step A1.

If, by contrast, it is determined in the seventh method step B4 that the differential pressure is equal to the minimum differential pressure or below the minimum differential pressure, the fifth method step C1 is carried out, according to which an opening signal is output from the control device to the vent valve 20 by means of the electronic control device. Subsequently, in the sixth method step D, when the opening signal is received, the vent valve 20 is transferred into its open position, in which the operating liquid container interior 11 is fluidically connected to the atmosphere by means of the vent valve 20.

Figure 5:
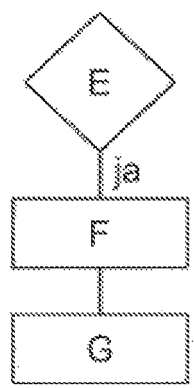
FIG. 5: shows a flowchart of a method according to the invention according to a fifth embodiment of the present invention.

FIG. 5 shows a flowchart of a method according to the invention according to a fifth embodiment of the present invention.

The method according to the fifth embodiment of the present invention follows method step D of the previous embodiments, according to which, when an opening signal is received, the vent valve 20 is transferred into its open position.

In an eighth method step, it is determined whether a regenerating valve 50 arranged in a flushing line 72 or between a flushing connection 83 of an adsorption filter 80 and the flushing line 72 is in an open position, wherein the flushing line 72 fluidically connects an adsorption filter interior to an intake tract of an internal combustion engine of the motor vehicle. Subsequently, in a ninth method step F, a closing signal is output from the control device to the vent valve 20 when the regenerating valve 50 is in the open position. In a tenth method step G, when the closing signal is received by the vent valve 20, the vent valve 20 is transferred into a closed position, in which the operating liquid container interior 11 is fluidically separated from the atmosphere by means of the vent valve 20.

Figure 6:
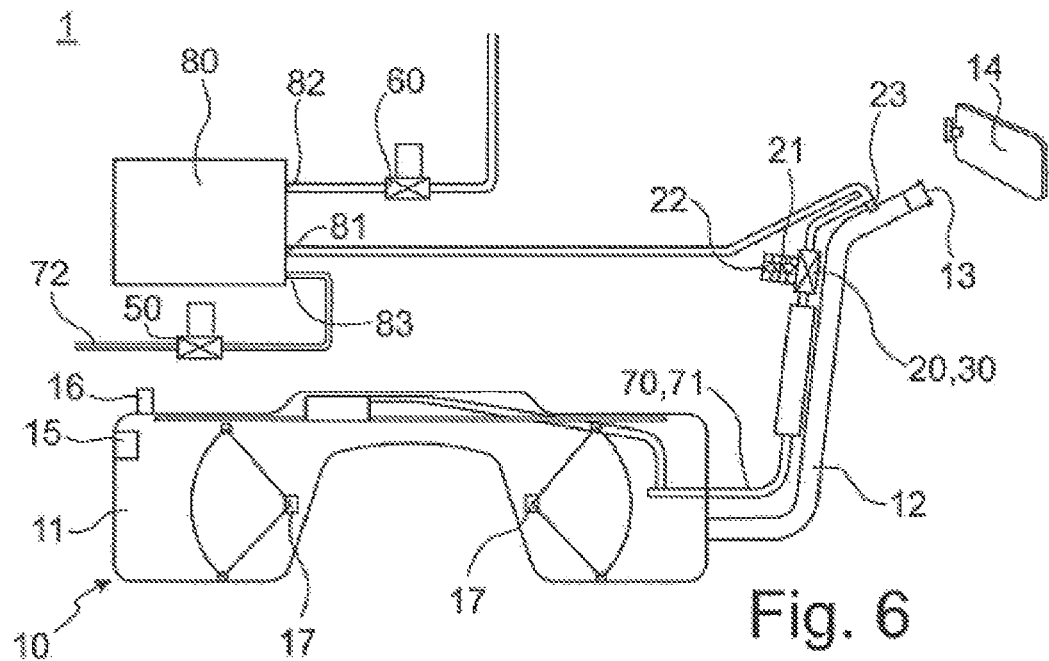
FIG. 6: shows an operating liquid container system according to the invention according to a sixth embodiment of the present invention.

FIG. 6 illustrates an operating liquid container system 1 according to a sixth embodiment of the present invention, wherein the operating liquid container system 1 is configured to carry out a method according to one of the first to fifth exemplary embodiments. The operating liquid container system illustrated in FIG. 6 is configured as what is known as an onboard refueling vapor recovery system.

The operating liquid container system 1 has an operating liquid container 10, which is configured as a fuel container 10 in the present exemplary embodiment and in the following exemplary embodiments. In an operating liquid container interior 11 of the operating liquid container 10, a pressure sensor 15 for determining an internal pressure of the operating liquid container interior 11 is arranged. The operating liquid container 10 is in the form of a saddle tank 10 in the exemplary embodiment illustrated, wherein, in two main volumes of the operating liquid container 10, respective filling level sensors 17 for determining a filling level in the two main volumes of the operating liquid container 10 are arranged.

In the exemplary embodiment illustrated, the operating liquid container interior 11 is vented via a vent line 70, 71, which, in the exemplary embodiment illustrated, is configured as a service and/or refueling vent line 70, 71, and which is consequently suitable for venting during operation and for venting during a refueling process. Arranged in the vent line 70, 71 is a vent valve 20, 30, which is configured as a service and/or refueling vent valve 20, 30 in the exemplary embodiment illustrated.

The operating liquid container system 1 has a filler tube 12 that leads into the operating liquid container interior 11. The filler tube 12 is closable by a filler tube cover 13. It is also apparent from FIG. 6 that the operating liquid container system 1 also has a fuel filler flap 14, behind which a filler neck, which is arranged on one side of the filler tube 12, is arranged. When a nozzle is introduced into the filler tube 12 via the filler neck, a gas flow is controlled by means of a gas flow control element 23. The gas flow can be controlled in such a way that the entire gas flow is conducted to an adsorption filter 80. Furthermore, the gas flow can be controlled in such a way that a part of the gas flow is recirculated into the operating liquid container interior 11. The gas flow can also be controlled in such a way that when a nozzle is introduced into the filler tube 12, the entire gas flow is conducted out of the filler neck of the filler tube 12. Furthermore, it is also possible for the gas flow to be controlled in such a way that, with a nozzle introduced into the filler tube 12, a part of the gas flow is conducted to the adsorption filter 80 and a residual gas flow is conducted out of the filler tube 12. If no nozzle has been introduced into the filler tube 12, during operation, a gas stream is always conducted to the adsorption filter 80 by the gas flow control element 23.

The operating liquid container system 1 has an overpressure protection valve 21 that is arranged in the vent line 70, 71. The overpressure protection valve 21 is movable or variable between an open position, in which gas exchange is allowed by the overpressure protection valve 21, and a closed position, in which gas exchange is prevented by the overpressure protection valve 21. In this case, the overpressure protection valve 21 is in its closed position when the internal pressure in the operating liquid container interior 11 is below a predetermined maximum pressure. By contrast, the overpressure protection valve 21 is in its open position when the internal pressure in the operating liquid container interior 11 is above the maximum pressure. The operating liquid container system 1 also has a negative pressure protection valve 22 that is arranged in the vent line 70, 71. The negative pressure protection valve 21 is movable or variable between an open position, in which gas exchange is allowed by the negative pressure protection valve 21, and a closed position, in which gas exchange is prevented by the negative pressure protection valve 21. The negative pressure protection valve 22 is in its closed position when the internal pressure in the operating liquid container interior 11 is above the minimum pressure. If the internal pressure in the operating liquid container interior 11 is below the minimum pressure, the negative pressure protection valve 22 is transferred into its open position.

As is apparent from FIG. 6, the operating liquid container system 1 also has an ambient pressure sensor 16 that is arranged outside the operating liquid container interior 11. By means of the internal pressure determined by the pressure sensor 15 and by means of the ambient pressure determined by the ambient pressure sensor 16, it is thus possible for a differential pressure between the internal pressure and the ambient pressure to be determined.

The adsorption filter 80 is fluidically connected to the operating liquid container interior 11 via an inlet connection 81. Furthermore, the adsorption filter 80 has an outlet connection 82, via which the adsorption filter 80 is fluidically connected to the atmosphere. As is apparent from FIG. 6, a tank isolation valve 60 is arranged between the atmosphere and the outlet connection 82 of the adsorption filter 80. In an open position of the tank isolation valve 60, the adsorption filter interior is fluidically connected to the atmosphere, whereas in a closed position of the tank isolation valve 60, the adsorption filter interior is fluidically separated from the atmosphere. The adsorption filter 80 also has a flushing connection 83, by means of which the adsorption filter interior is fluidically connected via a flushing line 72 to an intake tract of an internal combustion engine of a motor vehicle in which the operating liquid container system 1 is installed. Arranged between the flushing connection 83 and the intake tract of the internal combustion engine (not illustrated) is a regenerating valve 50. In an open position of the regenerating valve 50, the adsorption filter interior is fluidically connected to the intake tract, whereas in a closed position of the regenerating valve 50, the adsorption filter interior is fluidically separated from the intake tract.

The vent valve 20, or the service and/or refueling vent valve 20, 30, the regenerating valve 50 and the tank isolation valve 60 are each configured as electrically actuable valves. Consequently, these valves can be adjusted electrically, that is to say electromechanically and/or electromagnetically, between an open position and a closed position. Said valves are each connected via data lines to an electronic control device (not illustrated in the figures). Furthermore, the internal pressure sensor 15 and the ambient pressure sensor 16 are also connected to the electronic control device via data lines (not illustrated in the figures) for exchanging data. The same goes for the filling level sensors 17, which are connected via data lines to the electronic control device for data exchange. The electronic control device is configured to carry out the methods described in the first to fifth exemplary embodiments.

Figure 7:
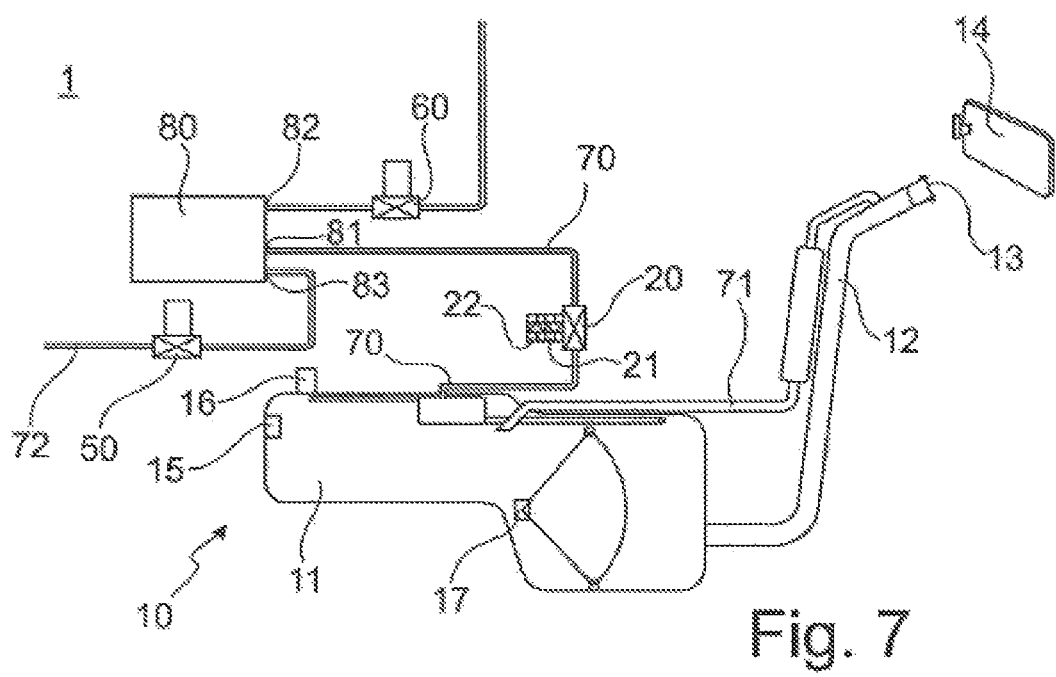
FIG. 7: shows an operating liquid container system according to the invention according to a seventh embodiment of the present invention.

FIG. 7 illustrates an operating liquid container system 1 according to a seventh embodiment of the present invention. In the operating liquid container system 1 according to the seventh embodiment, the operating liquid container 10 is not in the form of a saddle tank in which only a filling level sensor 17 is arranged. The vent valve 20 is configured as a service vent valve 20 and arranged in the vent line 70, which is configured as a service vent line 70. The overpressure protection valve 21 and the negative pressure protection valve 22 are likewise arranged in the service vent line 70 and are each movable between an open position, in which gas exchange through the respective valve is possible, and a closed position, in which gas exchange through the respective valve is prevented. The overpressure protection valve 21 is in this case in its closed position when the internal pressure in the operating liquid container interior 11 is below the maximum pressure. The overpressure protection valve 21 is transferred into its open position when the internal pressure in the operating liquid container interior 11 is above the maximum pressure. The negative pressure protection valve 22 is in its closed position when the internal pressure in the operating liquid container interior 11 is above the minimum pressure. When the internal pressure in the operating liquid container interior 11 is below the minimum pressure, the negative pressure protection valve 22 is transferred into its open position.

The operating liquid container interior 11 is furthermore configured via a refueling vent line 71 to the filler tube 12 in order to discharge gases during a refueling process, wherein the gases conducted out of the operating liquid container interior 11 are discharged via the filler neck of the filler tube 12. The remaining structure of the operating liquid container system 1 illustrates in FIG. 7 is identical to the structure and functionality of the operating liquid container system illustrated in FIG. 6, and so reference is made to the information given with respect to FIG. 6 with regard to the structure and functionality.

Figure 8:
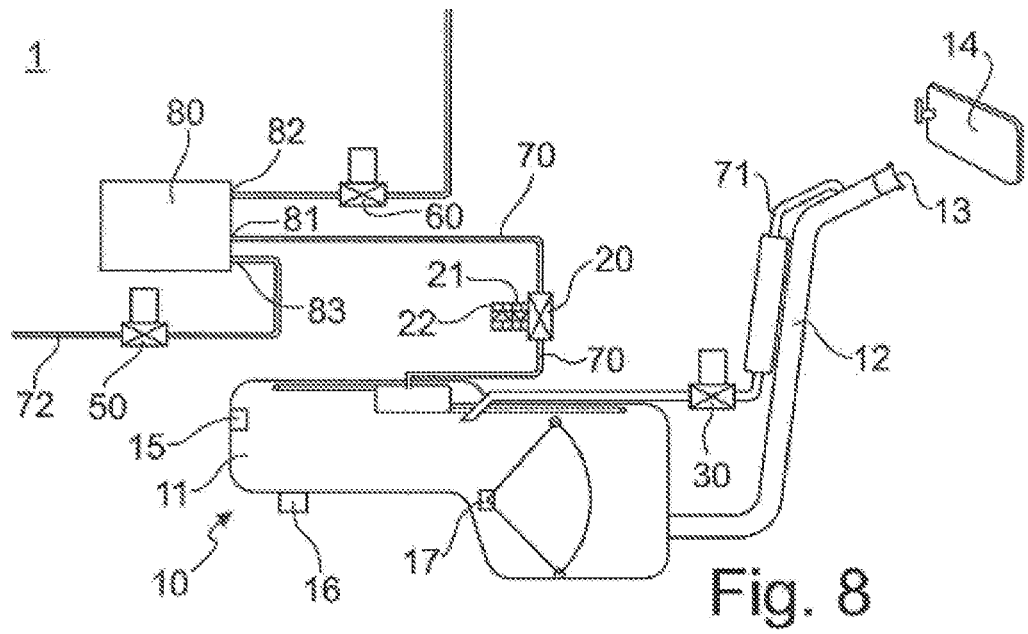
FIG. 8: shows an operating liquid container system according to the invention according to an eighth embodiment of the present invention.

FIG. 8 shows an operating liquid container system 1 according to an eighth embodiment of the present invention. The operating liquid container system 1 illustrated in FIG. 8 differs from the operating liquid container system 1 illustrated in FIG. 7 only in that an electrically actuable refueling vent valve 30 is arranged in the refueling vent line 71. The refueling vent valve 30 is, as already mentioned, connected to the electronic control device for data exchange via a data line (not illustrated). The remaining structure and the remaining functionality of the operating liquid container system 1 illustrated in FIG. 8 are identical to the structure and functionality of the operating liquid container system illustrated in FIG. 7.

Figure 9:
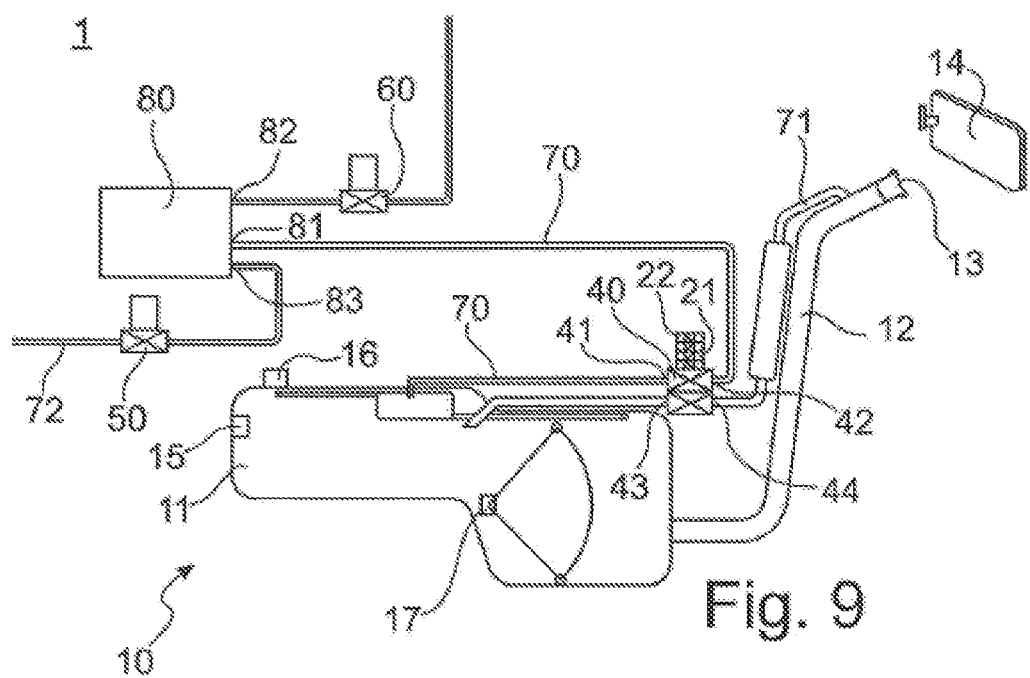
FIG. 9: shows an operating liquid container system according to the invention according to a ninth embodiment of the present invention.

FIG. 9 illustrates an operating liquid container system 1 according to a ninth embodiment of the present invention. In the operating liquid container system 1 according to the ninth embodiment, the service vent valve and the refueling vent valve have been combined to form a service and/or refueling vent valve 40. The service and/or refueling vent valve 40 has a service venting inlet connection 41, a service venting outlet connection 42, a refueling venting inlet connection 43 and a refueling venting outlet connection 44. In this case, the service venting inlet connection 41 and the refueling venting inlet connection 43 are each fluidically connected to the operating liquid container interior 11. The fluidic connection of the service venting inlet connection 41 to the operating liquid container interior 11 takes place in this case via the vent line 70, and the fluidic connection of the refueling venting inlet connection 43 to the operating liquid container interior 11 takes place via the refueling vent line 71. The service venting outlet connection 42 is fluidically connected to the atmosphere via the adsorption filter 80, and the refueling venting outlet connection 44 is fluidically connected to the filler tube 12.

The service and refueling vent valve 40 is electrically actuable or adjustable between an aerating position, a refueling position and a closed position. In the aerating position, the operating liquid container interior 11 is fluidically connected to the atmosphere and to the filler tube 12 by means of the service and refueling vent valve 40. In the refueling position, the operating liquid container interior 11 is fluidically separated from the atmosphere by means of the service and refueling vent valve 40 and fluidically connected to the filler tube 12 by means of the service and refueling vent valve 40. In the closed position of the service and/or refueling vent valve 40, the operating liquid container interior 11 is fluidically separated from the atmosphere and from the filler tube 12 by means of the service and refueling vent valve 40.

The adjustment of the service and refueling vent valve 40 between the aerating position, the refueling position and the closed position takes place preferably via a slide within the service and refueling vent valve 40.

The overpressure protection valve 21 and the negative pressure protection valve 22 are arranged in the service vent line 70 and are each movable between an open position, in which gas exchange through the respective valve is possible, and a closed position, in which gas exchange through the respective valve is prevented. The overpressure protection valve 21 is in this case in its closed position when the internal pressure in the operating liquid container interior 11 is below the maximum pressure. The overpressure protection valve 21 is transferred into its open position when the internal pressure in the operating liquid container interior 11 is above the maximum pressure. The negative pressure protection valve 22 is in its closed position when the internal pressure in the operating liquid container interior 11 is above the minimum pressure. When the internal pressure in the operating liquid container interior 11 is below the minimum pressure, the negative pressure protection valve 22 is transferred into its open position.

The remaining structure and the remaining functionality of the operating liquid container system 1 according to the ninth embodiment are identical to the structure and functionality of the operating liquid container system according to the eighth embodiment, and so reference is made to the information given there.

LIST OF REFERENCE SIGNS

1 Operating liquid container system
10 Operating liquid container/Fuel container/Fuel tank
11 Operating liquid container interior/Fuel container interior
12 Filler tube
13 Filler tube cover
14 Fuel filler flap/Filler cap
15 Pressure sensor/Internal pressure sensor
16 Ambient pressure sensor/External pressure sensor
17 Filling level sensor
20 Vent valve/Service vent valve
21 Overpressure protection valve
22 Negative pressure protection valve
23 Gas flow control element
30 Refueling vent valve
40 Service and refueling vent valve
41 Service venting inlet connection
42 Service venting outlet connection
43 Refueling venting inlet connection
44 Refueling venting outlet connection
50 Regenerating valve
60 Tank isolation valve
70 Vent line/Service vent line
71 Refueling vent line
72 Flushing line
80 Adsorption filter/Activated carbon filter
81 Inlet connection (of the adsorption filter)
82 Outlet connection (of the adsorption filter)
83 Flushing connection (of the adsorption filter)

The invention claimed is:

1. A method for controlling the internal pressure of an operating liquid container (10) of a motor vehicle, comprising:
   determining (A1) an internal pressure of the operating liquid container (10) by means of a pressure sensor (15) arranged in an operating liquid container interior (11);
   determining (A2) an ambient pressure of the operating liquid container (10) by means of an ambient pressure sensor (16);
   determining (A3) a differential pressure between the internal pressure and the ambient pressure by means of an electronic control device;
   comparing (B3) the differential pressure with a predetermined maximum differential pressure by means of the control device;
   outputting (C1) an opening signal from the control device to a vent valve (20, 40) that is arranged in a vent line (70) or between the operating liquid container interior (11) and the vent line (70), wherein the vent line (70) fluidically connects the operating liquid container interior (11) to the atmosphere when the determined differential pressure is equal to the maximum differential pressure or above the maximum differential pressure;
   transferring (D) the vent valve (20, 40) into an open position, in which the operating liquid container interior (11) is fluidically connected to the atmosphere by means of the vent valve (20), when the opening signal is received;
   determining (E) whether a regenerating valve (50) arranged in a flushing line (72) or between a flushing connection (83) of an adsorption filter (80) and the flushing line (72) is in an open position, wherein the flushing line (72) fluidically connects an adsorption filter interior to an intake tract of an internal combustion engine of the motor vehicle;
   outputting (F) a closing signal from the control device to the vent valve (20, 40) when the regenerating valve (50) is in the open position; and
   transferring (G) the vent valve (20) into a closed position, in which the operating liquid container interior (11) is fluidically separated from the atmosphere by means of the vent valve (20), when the closing signal is received, and the regenerating valve (50) remains opened.

2. The method as claimed in claim 1, further comprising:
   comparing (B4) the differential pressure with a predetermined minimum differential pressure by means of the control device;
   outputting (C1) an opening signal from the control device to the vent valve (20, 40) when the determined differential pressure is equal to the minimum differential internal pressure or below the minimum differential pressure; and
   transferring (D) the vent valve (20, 40) into the open position, in which the operating liquid container interior (11) is fluidically connected to the atmosphere by means of the vent valve (20), when the opening signal is received.

3. The method as claimed in claim 1, wherein the vent valve (20, 40) is transferred gradually into its open position.

4. An operating liquid container system (1) comprising:
   at least one operating liquid container (10);
   at least one pressure sensor (15), arranged in an operating liquid container interior (11), for determining an internal pressure of the operating liquid container interior (11);

a vent line (70) that fluidically connects the operating liquid container interior (11) to the atmosphere;

an electrically actuable vent valve (20, 40) that is arranged in the vent line (70) or between the operating liquid container interior (11) and the vent line (70) and is actuable between an open position, in which the operating liquid container interior (11) is fluidically connected to the atmosphere, and a closed position, in which the operating liquid container interior (11) is fluidically separated from the atmosphere by means of the vent valve (20); and an electronic control device that is connected to the pressure sensor (15) and the vent valve (20, 40) via a data line and is configured to carry out a method as claimed in claim 1, wherein the operating liquid container system (1) has an ambient pressure sensor (16) for determining an ambient pressure of the operating liquid container (10); and the electronic control device is configured to carry out a method as claimed in claim 1.

5. The operating liquid container system (1) of claim 4, further comprising: an adsorption filter (80) that is fluidically connected to the vent line (70) by means of an inlet connection (81) and to the atmosphere by means of an outlet connection (82).

6. The operating liquid container system (1) of claim 4, further comprising:

an overpressure protection valve (21) that is arranged in the vent line (70) or between the operating liquid container interior (11) and the vent line (70), wherein the overpressure protection valve (21) is movable between an open position, in which gas exchange is allowed by the overpressure protection valve (21), and a closed position, in which gas exchange is prevented by the overpressure protection valve;

wherein the overpressure protection valve (21) is in its closed position when the internal pressure in the operating liquid container interior (11) is below the maximum pressure; and wherein the overpressure protection valve (21) is transferred into its open position when the internal pressure in the operating liquid container interior (11) is above the maximum pressure.

7. The operating liquid container system (1) of claim 4, further comprising:

a negative pressure protection valve (22) that is arranged in the vent line (70) or between the operating liquid container interior (11) and the vent line (70), wherein the negative pressure protection valve (22) is movable between an open position, in which gas exchange is allowed by the negative pressure protection valve (22), and a closed position, in which gas exchange is prevented by the negative pressure protection valve;

wherein the negative pressure protection valve (22) is in its closed position when the internal pressure in the operating liquid container interior (11) is above the minimum pressure; and wherein the negative pressure protection valve (22) is transferred into its open position when the internal pressure in the operating liquid container interior (11) is below the minimum pressure.

8. The operating liquid container system (1) of claim 4, further comprising:

a filler tube (12) that leads into the operating liquid container interior (11), and a refueling vent line (71) that is fluidically connected to the operating liquid container interior (11) and the filler tube (12), wherein the electrically actuable vent valve (20, 40) is configured as a service and/or refueling vent valve (40) with a service venting inlet connection (41), a service venting outlet connection (42), a refueling venting inlet connection (43) and a refueling venting outlet connection (44);

wherein the service venting inlet connection (41) and the refueling venting inlet connection (43) are each fluidically connected to the operating liquid container interior (11), the service venting outlet connection (42) is fluidically connected to the atmosphere, and the refueling venting outlet connection (44) is fluidically connected to the filler tube (12);

wherein the service and/or refueling vent valve (40) is electrically actuable between a venting position, a refueling position and a closed position;

wherein in the venting position, the operating liquid container interior (11) is fluidically connected to the atmosphere and to the filler tube (12) by means of the service and/or refueling vent valve (40);

wherein in the refueling position, the operating liquid container interior (11) is fluidically separated from the atmosphere by means of the service and/or refueling vent valve (40) and fluidically connected to the filler tube (12) by means of the service and/or refueling vent valve (40); and wherein in the closed position, the operating liquid container interior (11) is fluidically separated from the atmosphere and the filler tube (12) by means of the service and/or refueling vent valve (40).

* * * * *